US009372855B1

(12) United States Patent
Petts (10) Patent No.: US 9,372,855 B1
(45) Date of Patent: Jun. 21, 2016

(54) TRANSACTIONAL CONTROL OF RDBMS DATABASE DEFINITION LANGUAGE OPERATIONS

(75) Inventor: James C. Petts, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 13/477,169

(22) Filed: May 22, 2012

(51) Int. Cl.
*G06F 17/30* (2006.01)
(52) U.S. Cl.
CPC .............................. *G06F 17/30008* (2013.01)
(58) Field of Classification Search
CPC ................. G06F 17/30008; G06F 17/30002; G06F 11/1471
USPC ............. 707/674–686; 711/161, 162; 714/13, 714/15, 18, 19
See application file for complete search history.

(56) References Cited

U.S. PATENT DOCUMENTS

| 6,421,677 | B1 * | 7/2002 | DeKimpe et al. | |
| 6,453,322 | B1 * | 9/2002 | DeKimpe et al. | |
| 6,480,848 | B1 * | 11/2002 | DeKimpe et al. | 707/684 |
| 8,032,496 | B2 * | 10/2011 | Sinha et al. | 707/685 |
| 8,589,357 | B2 * | 11/2013 | Radhakrishnan et al. | 707/684 |
| 2005/0114409 | A1 * | 5/2005 | Sinha et al. | 707/203 |
| 2008/0098045 | A1 * | 4/2008 | Radhakrishnan et al. | 707/203 |
| 2009/0300075 | A1 * | 12/2009 | Guan et al. | 707/202 |

OTHER PUBLICATIONS

Justus S et al., The Theory of Time and Space in Object Relational Databases, IEEE, 2007, 575-580.*
Oracle White Paper, "Edition-Based Redefinition" Jul. 26, 2009, [online][retrieved on May 23, 2012] retrieved at: http://www.oracle.com/technetwork/database/features/availability/edition-based-re-definition-1-133045.pdf, 45 pps.

* cited by examiner

*Primary Examiner* — Jean B Fleurantin
(74) *Attorney, Agent, or Firm* — Lee & Hayes, PLLC (57) ABSTRACT

Database Definition Language (DDL) transactions are defined that include one or more DDL operations that are to be executed to modify aspects of a relational database, such as its structure. If performance of one or more of the DDL operations in a DDL transaction fails, then the changes made to the relational database by some or all of the DDL operations may be reversed. Instructions and state information may be generated and stored prior to, during, and/or following the execution of a DDL operation that may be utilized to reverse the changes to a relational database made by the DDL operations. User interfaces might also be provided for defining, selecting, editing, and executing DDL transactions, and for providing information relating to the execution and rollback of DDL operations in a DDL transaction.

14 Claims, 7 Drawing Sheets

TRANSACTIONAL CONTROL OF RDBMS DATABASE DEFINITION LANGUAGE OPERATIONS

BACKGROUND

Relational database management systems ("RDBMS") typically utilize the Database Definition Language ("DDL") to modify the structure of relational databases. DDL operations may provide functionality, for instance, for creating a new database, creating a table in a database, altering the structure of a table in a database, and removing a table from a database. DDL operations might also be provided for performing other types of modifications to the structure of a relational database.

The failure of a DDL operation on a relational database can cause various types of problems. For instance, a relational database may be left in an unknown state following the failure of a DDL operation. Other types of problems and side effects might also be encountered if a DDL operation fails. Recovering a relational database from the failure of a DDL operation, however, can be very complex and time consuming. As a result, the operator of a RDBMS may suffer significant operational losses while a relational database is repaired following the failure of DDL operation.

It is with respect to these and other considerations that the disclosure made herein is presented.

DETAILED DESCRIPTION

The following detailed description is directed to technologies for transactional control of RDBMS DDL operations. Through an implementation of the concepts and technologies disclosed herein, changes made to a relational database by a DDL operation can be quickly and easily reversed. In this way, operational losses caused by the failure of a DDL operation can be minimized.

According to aspects presented herein, computing systems are disclosed that are configured for transactional control of RDBMS DDL operations. In particular, the computing systems presented herein are configured to allow an operator to define a DDL "transaction." A DDL transaction is one or more DDL operations. As mentioned above, DDL operations modify the structure of relational databases. DDL operations may provide functionality for creating a new database, creating a table in a database, altering the structure of a table in a database, removing a table from a database, and for performing other types of modifications to the structure of a relational database.

If the DDL operations in a DDL transaction do not all succeed, then the changes made by some or all of the DDL operations in the DDL transaction are reversed. For instance, any changes made to the structure of a relational database by DDL operations in a DDL transaction may be reversed such that the database is in the same state that it was in just prior to the performance of the DDL operations in the DDL transaction. In some embodiments, a checkpoint is created following the successful execution of each DDL operation in a DDL transaction. In these embodiments, the DDL operations may be rolled back to a checkpoint in the event that a later DDL operation in the DDL transaction fails.

According to other aspects, data is generated and stored prior to, during, and/or following the execution of a DDL operation that may be utilized to reverse the changes to a relational database made by the DDL operations. For example, instructions may be generated and stored which, when executed, cause the changes made by a DDL operation to be reversed. As an example, if a DDL operation creates a new table in a relational database, then instructions may be generated and stored for removing the newly created table. In this way, the stored instructions may be executed in the reverse order that the DDL operations were performed in order to reverse the changes to a relational database made by DDL operations in a DDL transaction. It should be appreciated that other types of instructions for reversing other types of changes to a relational database might also be generated.

State information might also be stored that describes the state of a relational database just prior to the performance of a DDL operation. Similarly, state information might also be stored that describes the state of the relational database just following the performance of a DDL operation. This state information might also be utilized to reverse the changes made to a relational database by DDL operations in a DDL transaction in the event that execution of one or more of the DDL operations fails.

According to other aspects presented herein, user interfaces might also be provided for defining, selecting, editing, executing, and performing other functions with regard to DDL transactions. User interfaces might also be provided for allowing a user to request the rollback of DDL operations and for indicating whether all or a subset of the DDL operations should be reversed. For example, the user interfaces might provide functionality for allowing a user to select a checkpoint to which the DDL operations should be rolled back. These user interfaces might also be configured to present information relating to the execution and rollback of DDL operations in a DDL transaction. Other types of user interfaces might also be provided. Additional details regarding these and other aspects of the various technologies disclosed herein will be provided below with regard to FIGS. 1-6.

It should be appreciated that the embodiments disclosed herein might be utilized with any type of computer, computing system, device, Web site, application program, operating system, or other type of system or component. Accordingly, although the embodiments disclosed herein are primarily presented in the context of computing systems that embody the concepts disclosed herein for transactional control of RDBMS DDL operations, the disclosure presented herein is not limited to such an implementation.

It should be also appreciated that the subject matter presented herein may be implemented as a computer-implemented method or process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
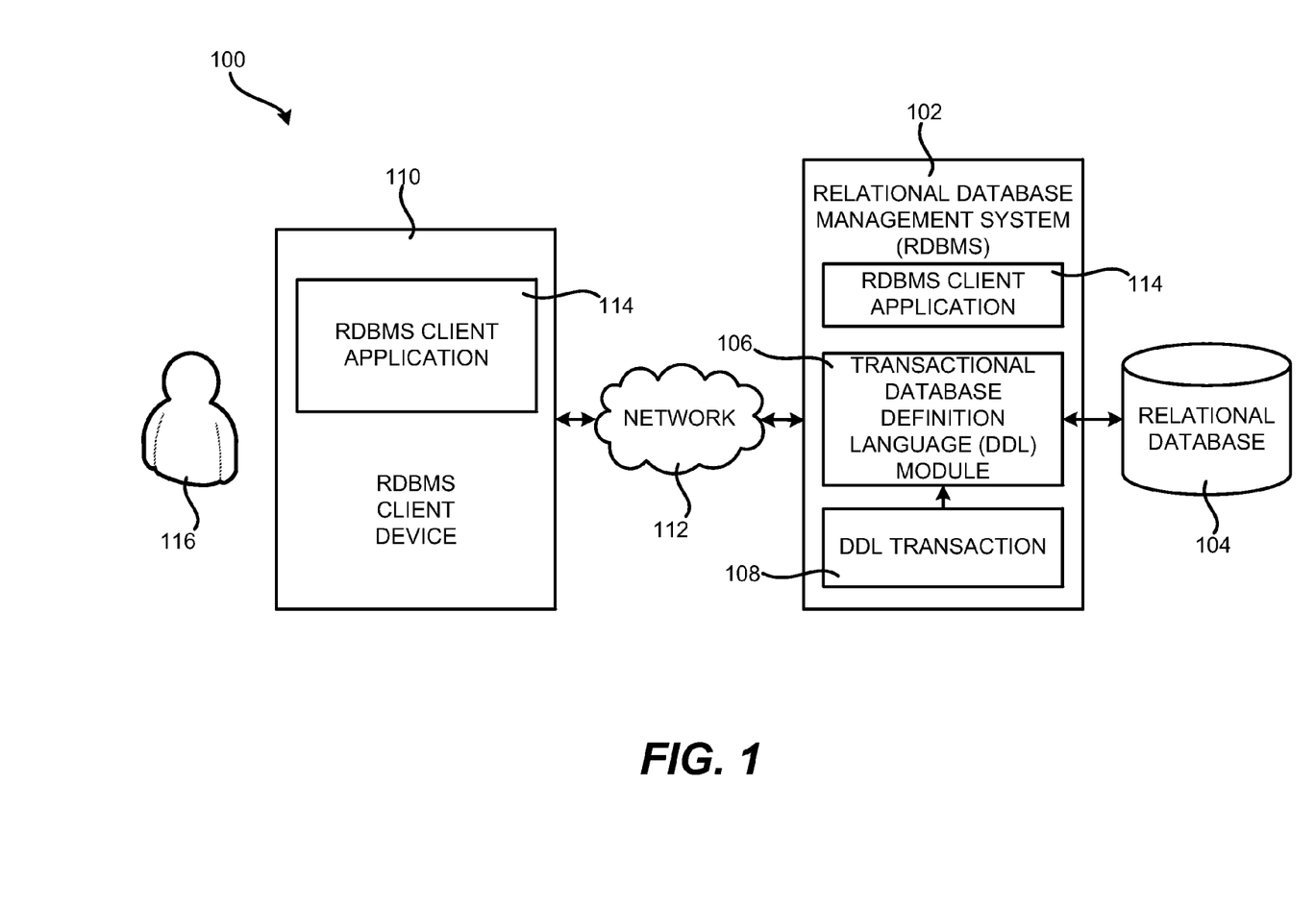
FIG. 1 is a system diagram showing an illustrative configuration for a computing system that is configured to provide transactional control of RDBMS DDL operations, according to one embodiment disclosed herein.

FIG. 1 and the following description are intended to provide a brief, general description of a suitable computing environment in which the embodiments described herein may be implemented. In particular, FIG. 1 is a system and network diagram that shows an illustrative operating environment 100 including several hardware and software components for providing transactional control of RDBMS DDL operations. As discussed above, the environment 100 is merely illustrative and the embodiments disclosed herein might be utilized in many different types of environments.

As illustrated in FIG. 1, the environment 100 includes an RDBMS 102. The RDBMS 102 is a relational database management system configured to allow the creation, modification, and utilization of a relational database 104. As known in the art, a relational database 104 is a collection of data items organized as a set of formally described tables and relationships between the tables. Example RDBMS that may be utilized to implement the functionality disclosed herein include, but are not limited to, MYSQL from ORACLE CORPORATION and DB2 from IBM CORPORATION.

It should be appreciated that although only a single relational database 104 has been illustrated in FIG. 1, the RDBMS 102 may be utilized to create, maintain, query, and otherwise utilize many such relational databases. Additionally, it should be appreciated that the RDBMS 102 shown in FIG. 1 has been greatly simplified for ease of discussion and that such a system will include many more software and hardware components than illustrated in FIG. 1.

In order to access and utilize the database services and related functionality provided by the RDBMS 102, a user 116 may utilize an RDBMS client device 110 executing a RDBMS client application 114. The RDBMS client device 110 may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 112 and communicating with the RDBMS 102. The network 112 may be a local-area network ("LAN"), a wide-area network ("WAN"), the Internet, or any other networking topology known in the art for connecting the RDBMS client device 110 to the RDBMS 102.

It should be appreciated that although a network 112 is illustrated in FIG. 1, the network 112 is not required to utilize the embodiments disclosed herein. For example, in some embodiments the RDBMS client application 114 might execute locally on the same computer system that provides the RDBMS 102. In this embodiment no network 112 is required to utilize the concepts disclosed herein. Other implementations will be apparent to those skilled in the art.

The RDBMS client application 114 may be a Web browser application, such as the MOZILLA® FIREFOX® Web browser from MOZILLA FOUNDATION of Mountain View, Calif. The RDBMS client application 114 exchanges data with the RDBMS 102 using the hypertext transfer protocol ("HTTP") or another appropriate protocol over the network 112. It should be appreciated that the RDBMS client application 114 might also be a stand-alone client application configured for communicating with the RDBMS 102. The client application might also utilize any number of communication methods known in the art to communicate with the RDBMS 102 across the network 112, including remote procedure calls, SOAP-based Web services, remote file access, proprietary client-server architectures, and the like.

In one embodiment, the RDBMS 102 includes a number of application server computers (not shown in FIG. 1) that provide various database services. The application servers may execute a number of modules in order to provide database services and the other functionality disclosed herein. The modules may execute on a single application server or in parallel across multiple application servers in the RDBMS 102. In addition, each module may consist of a number of subcomponents executing on different application servers or other computing devices in the RDBMS 102. The modules may be implemented as software, hardware, or any combination of the two.

According to one embodiment, a transactional DDL module 106 executes as a part of the RDBMS 102. The transactional DDL module 106 provides the functionality disclosed herein for transactional control of RDBMS DDL operations. It should be appreciated, however, that the RDBMS 102 might provide this functionality in other ways. For example, in other embodiments other components might provide the functionality described herein for transactional control of RDBMS DDL operations.

In one embodiment, the user 116 can submit DDL operations to the RDBMS 102 expressed using the Database Definition Language ("DDL") to modify the structure of the relational database 104. DDL operations may provide functionality, for instance, for creating a new database 104, creating a table in the database 104, altering the structure of a table in the database 104, and removing a table from the database 104. DDL operations might also be provided for performing other types of modifications to the structure of the relational database 104.

As mentioned briefly above, the failure of a DDL operation on the relational database 104 can cause various types of problems. For instance, the relational database 104 may be left in an unknown state following the failure of a DDL operation. Other types of problems and side effects might also be encountered if a DDL operation fails. In order to minimize the negative effects of the failure of a DDL operation, the transactional DDL module 106 disclosed herein is configured to provide transactional control of RDBMS DDL operations.

In order to utilize the transactional control features described herein, a user 116 of the RDBMS 102 utilizes the RDBMS client application 114 and an appropriate interface provided by the RDBMS 102 to define a DDL transaction 108. A DDL transaction 108 is one or more DDL operations that are defined to succeed or fail together. More specifically, the DDL operations in a DDL transaction 108 must complete successfully. If all of the DDL operations in a DDL transaction 108 do not succeed, then the transactional DDL module 106 reverses some or all of the changes to the relational database 104 made by the DDL operations in the DDL transaction 108. In this way the transactional DDL module 106 will reverse changes made to the relational database 104 by DDL operations in a DDL transaction 108, such that the database 104 is in the same state that it was in just prior to the performance of the DDL operations in the DDL transaction 108. In other embodiments, a user might elect to rollback changes to a checkpoint, thereby reversing only some of changes made by the DDL operations. Additional details regarding this process will be provided below.

In order to reverse the changes made to a relational database 104 by a DDL transaction 108, the transactional DDL module 106 stores various types of information. For instance, the transactional DDL module 106 might generate and store various types of data prior to, during, and/or following the execution of a DDL operation in a DDL transaction 104 that may be utilized to reverse the changes to a relational database 104 made by the DDL operations. For example, the transactional DDL module 106 may generate and store instructions which, when executed, cause the changes made by a DDL operation to be reversed.

As an example, if a DDL operation in a DDL transaction 108 creates a new table in a relational database 104, then instructions may be generated and stored for removing the newly created table from the database 104. In this way, the stored instructions may be executed in the reverse order that the DDL operations in the DDL transaction 108 were performed in order to reverse the changes to the relational database 104. It should be appreciated that the transactional DDL module 106 might also generate, store, and utilize other types of instructions and data for reversing other types of changes to the relational database 104.

The transactional DDL module 106 might also store other kinds of data for use in reversing the changes made to a relational database 104 by DDL operations in a DDL transaction 108. For example, the transactional DDL module 106 might store state information that describes the state of the relational database 104 just prior to the performance of each DDL operation in a DDL transaction 108. Similarly, the transactional DDL module 106 might store state information that describes the state of the relational database 104 just following the performance of each DDL operation in a DDL transaction 108. The transactional DDL module 106 may utilize this state information to reverse the changes made to the structure and content of the relational database 104 by the DDL operations in a DDL transaction 108 in the event that execution of one or more of the DDL operations fails. Additional details regarding this process will be provided below.

The transactional DDL module 106 might also create a checkpoint following the successful execution of each DDL operation in a DDL transaction 108. As will be described in greater detail below, a user might elect to rollback all of the changes to the relational database 104 made by DDL operations in a DDL transaction 108 or might select a checkpoint to which the changes to the relational database 104 should be rolled back.

According to other aspects presented herein, the RDBMS 102 and/or the transactional DDL module 106 might present user interfaces for defining, selecting, editing, executing, and performing other functions with regard to the DDL operations in a DDL transaction 108. These user interfaces might also be configured to present information relating to the execution and rollback of DDL operations in a DDL transaction 108. The RDBMS 102 and/or the transactional DDL module 106 might also provide other types of user interfaces for creating, utilizing, and rolling back DDL transactions 108. These user interfaces might be implemented as graphical user interfaces ("GUIs"), command line interfaces ("CLIs"), application programming interfaces ("APIs"), or other types of user interfaces. Additional details regarding these and other aspects of the various technologies disclosed herein will be provided below with regard to FIGS. 2A-6.

Figure 2A:
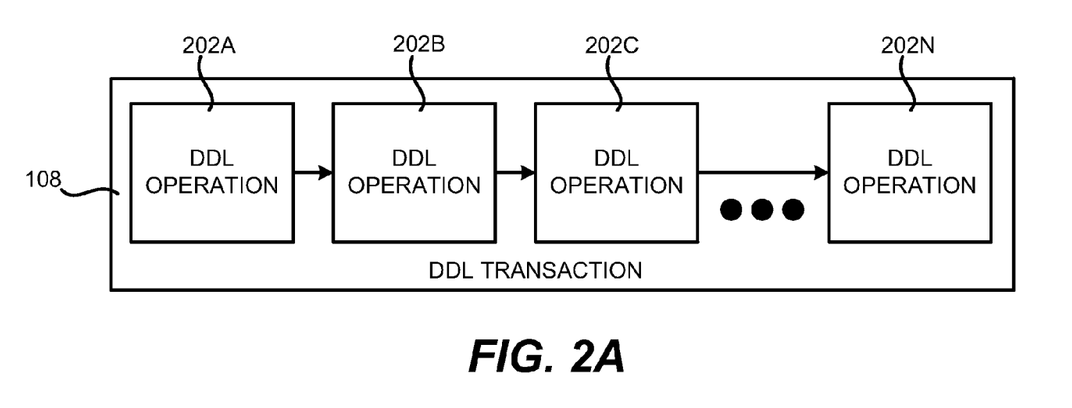
FIGS. 2A-2B are data structure diagrams showing aspects of the configuration of DDL operations in a DDL transaction, according to one embodiment disclosed herein.
Figure 2B:
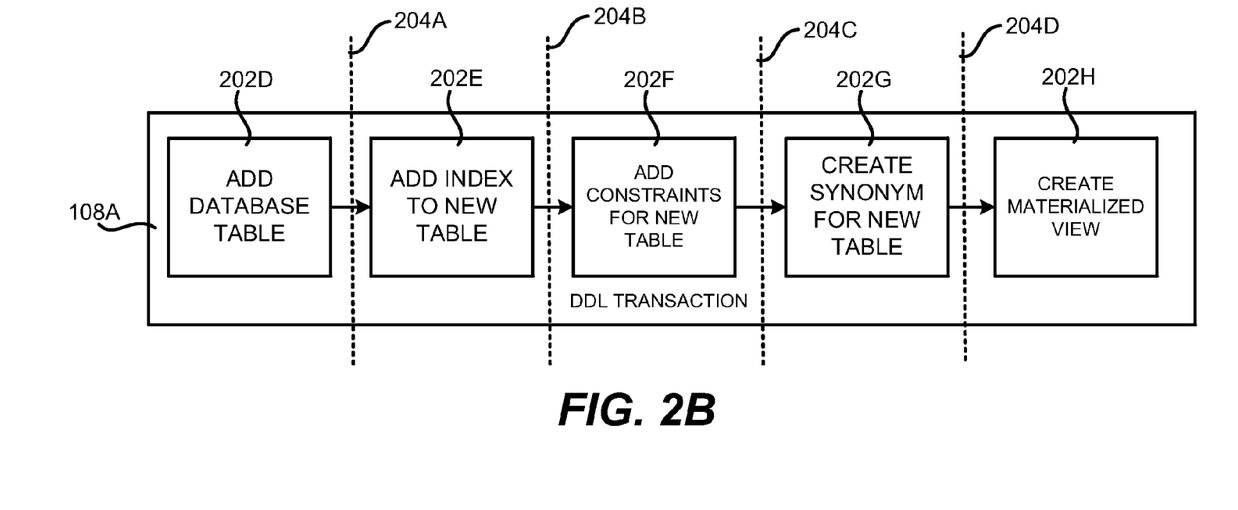

FIGS. 2A-2B are data structure diagrams showing aspects of the configuration of a DDL transaction 108, according to one embodiment disclosed herein. In particular, the DDL transaction 108 shown in FIG. 2A includes one or more DDL operations 202A-202N. As mentioned above, the DDL operations 202A-202N are operations that modify the structure of a relational database 104.

The DDL operations 202A-202N in a DDL transaction 108 are also defined such that they execute in a particular order. For example, in the DDL transaction 108 shown in FIG. 2A, the DDL operations 202A-202N have been defined to execute in a sequential order. The DDL operation 202A is executed first. The DDL operation 202B is then executed following the completion of the execution of the DDL operation 202A. The DDL operation 202C is then executed once the DDL operation 202B has completed its execution. This process continues until the last DDL operation in the DDL transaction, the DDL operation 202N in this example, has completed its execution.

It should be appreciated that a user 116 of the RDBMS 102 may define the DDL operations 202A-202N and the sequence in which the DDL operations 202A-202N should be performed. In this regard, the RDBMS 102 and/or the transactional DDL module 106 may provide a suitable user interface for allowing the user 116 to define a DDL transaction 108. The RDBMS 102 and/or the transactional DDL module 106 might also provide other types of user interfaces for performing other types of functions with respect to a DDL transaction 108, such as for instance user interfaces for editing a previously defined DDL transaction 108, requesting the execution of a DDL transaction 108, maintaining a library of DDL transactions 108, requesting the reversal of the changes made to a relational database 104 by DDL operations 202 and DDL transactions 108, and for performing other functions.

FIG. 2B shows an example DDL transaction 108A that includes DDL operations 202D-202H for adding a table to a relational database 104 and for performing related functionality. In this example, a DDL operation 202D has been defined for adding a new table to the relational database 104. Once the new database table has been created, the DDL operation 202E is executed for adding a new index to the newly created database table. Once the index has been generated, the DDL operation 202F is performed for adding constraints for the newly created table. Once the constraints have been added, the DDL operation 202G is performed for creating a synonym for the new table. Once this operation has completed its execution, the DDL operation 202H is performed to create a materialized view for the new table. Once this has completed, the performance of the DDL transaction 108A has been completed.

As will be described below, after the failure of any of the DDL operations 202D-202H in the DDL transaction 108A a user may cause some or all of the changes made to the relational database 104 to be reversed. For example, if the DDL operation 202F were to fail, the transactional DDL module 106 is configured to reverse any changes made to the relational database 104 by a sequential set of DDL operations consisting of the DDL operations 202F, 202E, and 202D. These changes made by these DDL operations are rolled back in the reverse order in which they were applied. Similarly, if the DDL operation 202H were to fail, the transactional DDL module 106 would reverse any changes to the relational database 104 made by the sequential set of DDL operations consisting of the DDL operations 202H, 202G, 202F, 202E, and 202D, in that order. In this way, the relational database 104 can be returned to the exact state it was in prior to the execution of any subset of the DDL operations 202D-202H in the DDL transaction 108A. Additional details regarding this process are provided below.

As mentioned briefly above, the transactional DDL module 106 is configured in various embodiments to create checkpoints following the successful execution of each DDL operation 202. In the event of the failure of execution of a DDL operation 202, the transactional DDL module 106 may allow a user 116 to indicate whether all of the DDL operations 202 should be rolled back or whether the DDL operations 202 should be rolled back to a particular checkpoint. For instance, in the example shown in FIG. 2B, checkpoints 204A-204D have been created following the successful execution of the DDL operations 202D-202G, respectively. If the DDL operation 202H fails execution, the user 116 might specify that the changes to the relational database 104 be rolled back to any of the checkpoints 204A-204D. Additional details regarding this process will be provided below.

It should be appreciated that the example DDL transaction 108A shown in FIG. 2B is merely illustrative. Other types of DDL transactions 108 might be defined for performing other types of functions that include more or fewer DDL operations 202 than shown in FIG. 2B. Other types of instructions might also be provided for specifying the order in which DDL operations 202 in a DDL transaction 108 should be executed. It should also be appreciated that data defining DDL transactions 108 and the checkpoints 204 might be stored in an appropriate format and location, such as within a table in a relational database 104.

Figure 3:
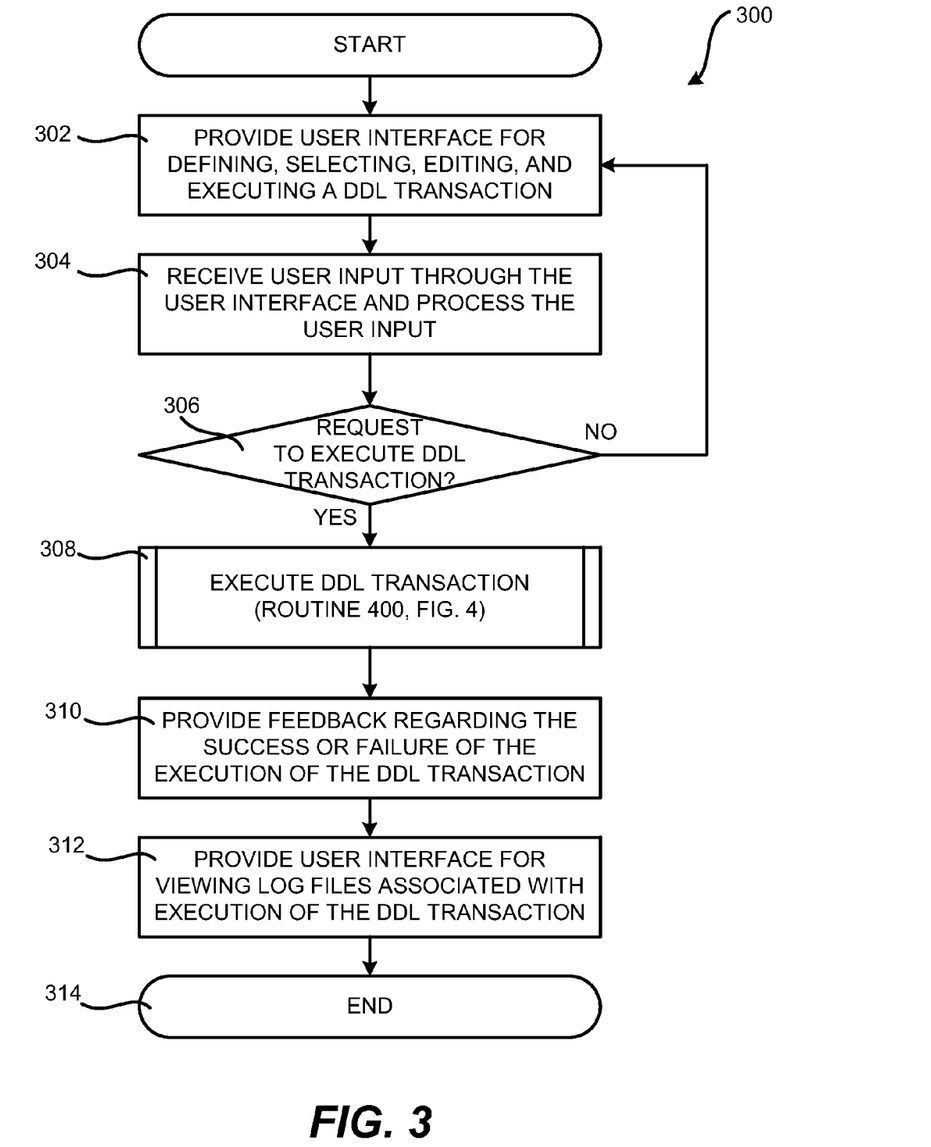
FIG. 3 is a flow diagram showing aspects of one illustrative routine for providing transactional control of RDBMS DDL operations, according to one embodiment disclosed herein.

Turning now to FIG. 3, additional details will be provided regarding the embodiments described herein for transactional control of RDBMS DDL operations. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing aspects of one illustrative routine 300 for transactional control of RDBMS DDL operations according to one embodiment disclosed herein. The routine 300 begins at operation 302, where the RDBMS 102 and/or the transactional DDL module 106 provides an appropriate user interface for allowing a user 116 to define, select, edit, and/or execute a DDL transaction 108. The user interface may be provided by way of the RDBMS client application 114. Other types of user interfaces might also be provided for utilizing the functionality disclosed herein.

From operation 302, the routine 300 proceeds to operation 304, where input is received by way of the user interface provided at operation 302. The routine 300 then proceeds to operation 306, where the RDBMS 102 and/or the transactional DDL module 106 determines whether the user 116 has requested to execute a DDL transaction 108. If the user 116 has not requested to execute a DDL transaction 108, the routine 300 proceeds back to operation 302, described above where additional user input may be received and processed.

If the user 116 requests the execution of a DDL transaction 108 at operation 306, the routine 300 proceeds to operation 308. At operation 308, the DDL transaction 108 is executed. Additional details regarding the execution of the DDL transaction 108 are provided below with regard to FIG. 4. From operation 308, the routine 300 proceeds to operation 310.

At operation 310, the user interface provided by the RDBMS 102 and/or the transactional DDL module 106 presents information regarding the success or failure of the execution of the DDL transaction 108. If the execution of the DDL transaction 108 failed, the user interface might also present information regarding the rollback of the changes to the relational database 104 made by the DDL transaction 108. Other types of feedback might also be presented in the user interface.

From operation 310, the routine 300 proceeds to operation 312, where a user interface might also be presented for viewing log files showing detailed information regarding the execution of the DDL transaction 108. Log files associated with the reversal of changes made to the relational database 104 by the DDL transaction 108 might also be presented. Other types of log files and data regarding the execution of the DDL transaction and the rollback of changes might also be presented. From operation 312, the routine 300 proceeds to operation 314, where it ends.

Figure 4A:
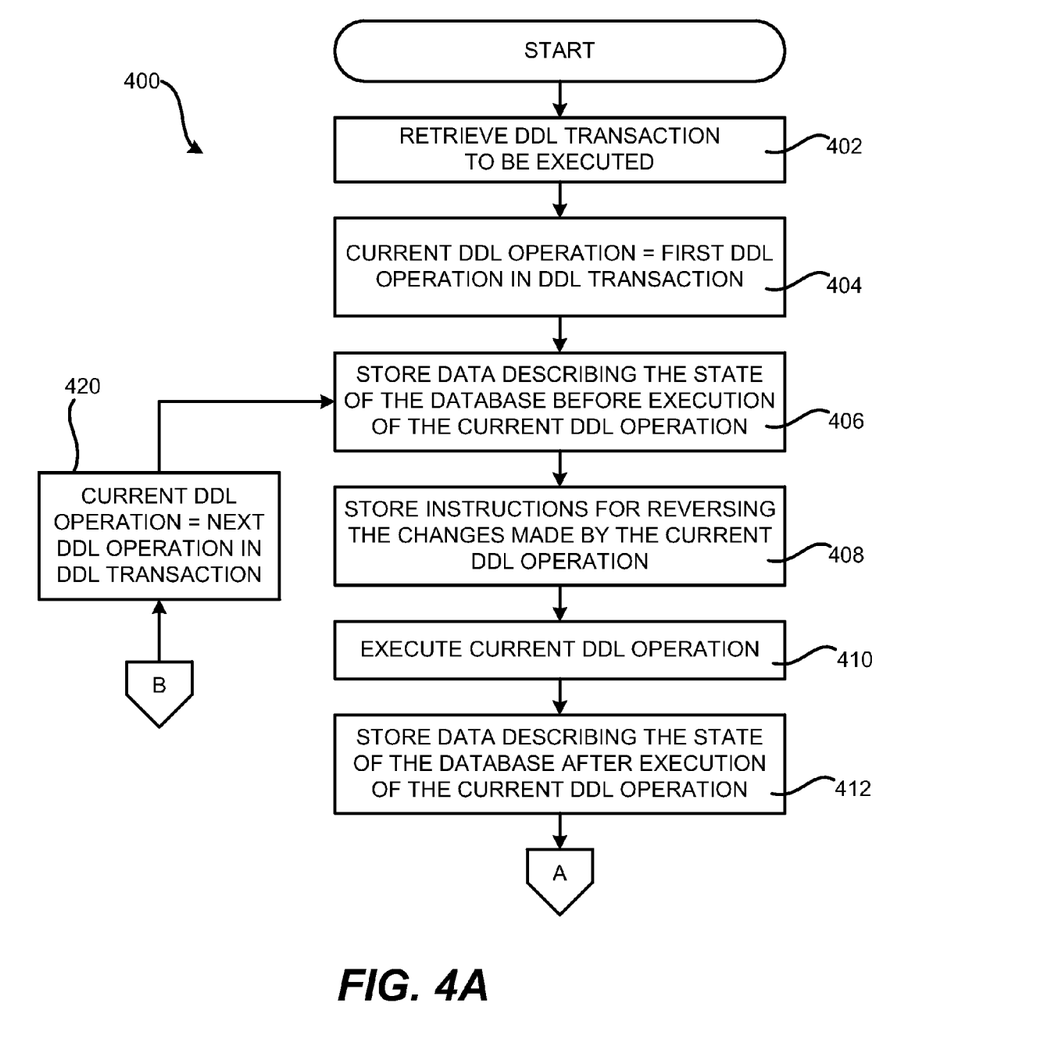
FIG. 4 is a flow diagram showing aspects of one illustrative routine for performing DDL operations in a DDL transaction, according to one embodiment disclosed herein.
Figure 4B:
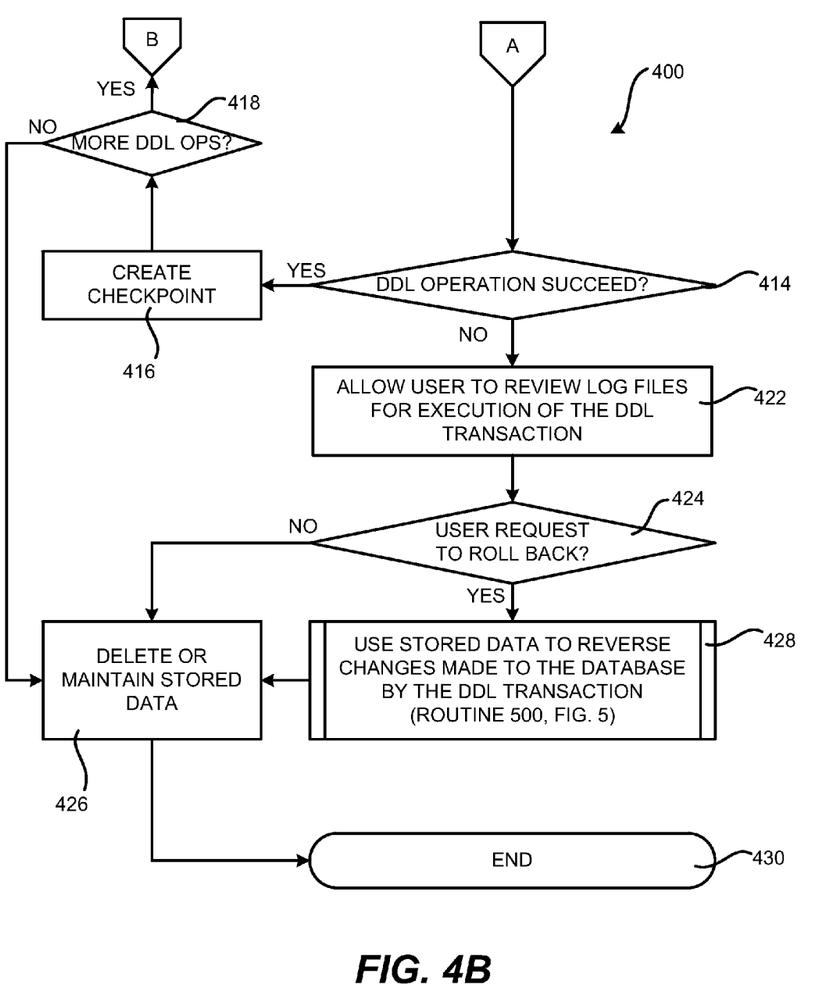

FIG. 4 is a flow diagram showing aspects of one illustrative routine 400 for performing DDL transactions 108, according to one embodiment disclosed herein. The routine 400 begins at operation 402, where the DDL transaction 108 to be executed is retrieved. As mentioned above, DDL transactions 108 might be stored in a database 104 or in another appropriate storage location within the RDBMS 102 or connected computer system.

From operation 402, the routine 400 proceeds to operation 404, where a temporary variable is initialized for use in keeping track of the current DDL operation 202 in the DDL transaction 108 that is being executed. The variable is initialized to reflect the first DDL operation 202 in the DDL transaction 108. Once the variable has been initialized at operation 404, the routine 400 proceeds to operation 406.

At operation 406, the transactional DDL module 106 and/or the RDBMS 102 stores data describing the state of the relational database 104 just prior to the execution of the current DDL operation 202. The state information may reflect the structure and/or content of the relational database 104 before execution of the current DDL operation 202. Once the state information has been stored, the routine 400 proceeds from operation 406 to operation 408.

At operation 408, the transactional DDL module 106 and/or the RDBMS 102 stores instructions for reversing the current DDL operation 202. For example, if the current DDL operation 202 is for adding a table to the relational database 104, instructions will be generated and stored for removing the table from the relational database 104. In this way, instructions are created and stored for reversing changes to the relational database 104 by each of the DDL operations 202 in a DDL transaction 108.

From operation 408, the routine 400 proceeds to operation 410 where the RDBMS 102 performs the current DDL operation 202. As mentioned above, a DDL operation 202 will typically modify the structure of the relational database 104 but might also modify data stored in a relational database 104. Once the current DDL operation 202 has been executed, the routine 400 proceeds from operation 410 to operation 412.

At operation 412, the transactional DDL module 106 and/or the RDBMS 102 stores data describing the state of the relational database 104 just after the execution of the current DDL operation 202. The state information may reflect the structure and/or content of the relational database 104 just following the execution of the current DDL operation 202. Once this state information has been stored, the routine 400 proceeds from operation 412 to operation 414.

At operation 414, the RDBMS 102 determines whether execution of the current DDL operation 202 succeeded or failed. If the current DDL operation 202 succeeded, the routine 400 proceeds to operation 416, where the RDBMS 102 and/or the transactional DDL module 106 creates a checkpoint 214. As mentioned above, the checkpoint 214 indicates a point in time at which a DDL operation 202 has successfully been executed. In the event of the failure of a subsequent DDL operation 202, a user 116 might elect to rollback changes to the relational database 104 to one or the checkpoints 214. Additional details regarding this process are provided below.

From operation 416, the routine 400 proceeds to operation 418, where the RDBMS 102 and/or the transactional DDL module 106 determines whether additional DDL operations 202 remain in the current DDL transaction 108 to be executed. If additional DDL operations 202 remain in the current DDL transaction 108 to be executed, the routine 400 proceeds from operation 416 to operation 420 where the variable utilized to keep track of the current DDL operation 202 is updated to reflect the next DDL operation 202 in the current DDL transaction 108 to be executed. The routine 400 then proceeds from operation 420 to operation 406, where state information is stored and the next DDL operation 202 is executed in the manner described above.

If, at operation 418, the RDBMS 102 and/or the transactional DDL module 106 determines that no additional DDL operations 202 remain to be executed in the current DDL transaction 108, the routine 400 proceeds to operation 426. At operation 426, the state data and instructions for rolling back the changes made by the DDL operations 202 in the DDL transaction 108 may be deleted. In other implementations, this information is retained for use in analyzing the execution of DDL operations 202 and the rollback of changes to the relational database 104. This information might also be presented in a user interface provided by the RDBMS 102 and/or the transactional DDL module 106 in the manner described above.

If, at operation 414, the RDBMS 102 determines that execution of the current DDL operation 202 did not succeed, the routine 400 proceeds from operation 414 to operation 422. At operation 422, the user 116 is provided an opportunity to review log files containing data relating to the failed execution of the DDL operation. A user interface might also be presented to the user 116 asking the user 116 whether they would like to rollback the changes made to the relational database 104.

If, at operation 424, the user 116 elects to rollback changes to the relational database 104, the routine 400 proceeds to operation 428 where RDBMS 102 and/or the transactional DDL module 106 utilizes the data stored at operations 406, 408, and 412 to reverse the changes made to the relational database 104 by some or all of the DDL operations 202 in the DDL transaction 108. In this manner, the relational database 104 may be returned to the state it was in prior to execution of the DDL transaction 108 or to another state specified by the user 116. Details regarding this process are provided below with regard to FIG. 5.

From operation 428, the routine 400 proceeds to operation 426 described above, where the data stored at operations 406, 408, and 412 may be destroyed or maintained for future use in the manner described above. From operation 426, the routine 400 proceeds to operation 430, where it ends.

Figure 5:
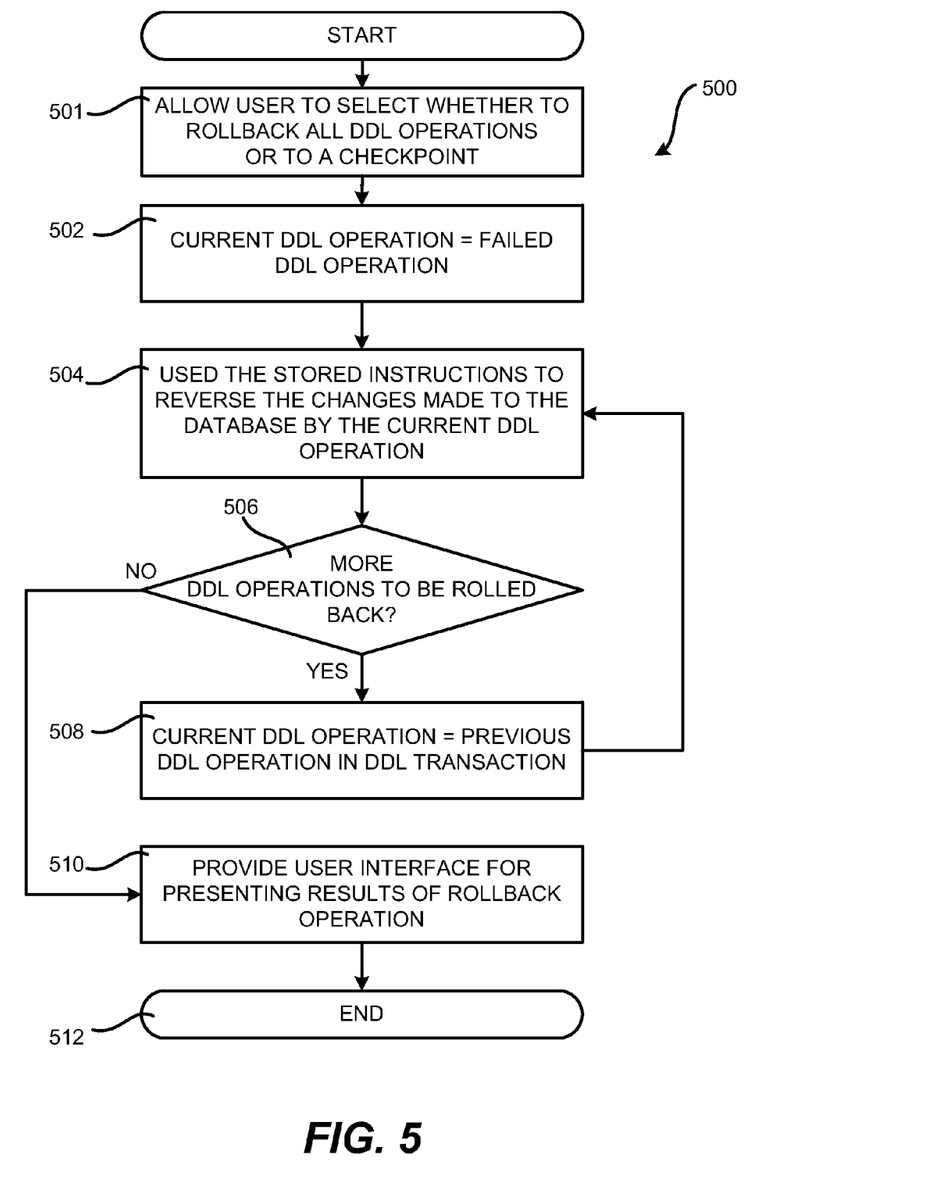
FIG. 5 is a flow diagram showing aspects of one illustrative routine for reversing the changes to the structure of a relational database made by DDL operations in a DDL transaction, according to one embodiment disclosed herein.

FIG. 5 is a flow diagram showing aspects of one illustrative routine 500 for reversing the changes to the structure of a relational database 104 made by DDL operations 202, according to one embodiment disclosed herein. The routine 500 begins at operation 501, where a user interface is presented allowing the user 116 to specify whether all of the changes to the relational database 104 made by DDL operations 202 in a DDL transaction 108 or whether only a subset of the changes should be rolled back. For example, the user 116 might be permitted to specify one of the checkpoints 204 to which the changes should be rolled back. Once the user 116 has specified the point to which changes to the relational database 104 should be rolled back, the routine 500 proceeds from operation 501 to operation 502.

At operation 502, a temporary variable is initialized that is utilized to keep track of the current DDL operation 202 that is being reversed. In particular, this variable is initialized to reflect the most recently executed DDL operation 202 in the DDL transaction 108. This will typically be the DDL operation 202 in the DDL transaction 108 for which execution failed.

From operation 502, the routine 500 proceeds to operation 504, where the instructions stored at operation 408 are utilized to reverse the changes made to the relational database 104 by the current DDL operation 202. Additionally, the state information stored at operations 406 and 412 might also be utilized to restore the relational database 104 to the state it was in just prior to execution of the current DDL operation 108. Once the changes made to the relational database 104 by the current DDL operation 108 have been reversed, the routine 500 proceeds from operation 504 to operation 506.

At operation 506, the RDBMS 102 and/or the transactional DDL module 106 determine whether additional DDL operations 202 remain in the DDL transaction 108 for which changes need to be reversed. For example, the RDBMS 102 and/or the transactional DDL module 106 might determine whether a selected checkpoint 204 has been reached. If the user 116 has requested that all of the changes to the relational database 104 be rolled back, the RDBMS 102 and/or the transactional DDL module 106 might determine whether any additional DDL operations 202 remain to be rolled back in the current DDL transaction 108.

If additional DDL operations 202 remain to be processed, the routine 500 proceeds from operation 506 to operation 508. At operation 508, the variable utilized to keep track of the current DDL operation 202 is incremented to reflect the next most recent DDL operation 202 that was executed in the DDL transaction 108. The routine 500 then proceeds back to operation 504, where the changes to the relational database 104 made by the current DDL operation 202 are reversed. In this manner, some or all of the changes made by the DDL operations 202 in the DDL transaction 108 are rolled back in the reverse order from which they were originally applied.

If, at operation 506, the RDBMS 102 and/or the transactional DDL module 106 determines that no additional DDL operations 202 remain to be rolled back, the routine 500 proceeds from operation 506 to operation 510. At operation 510, the RDBMS 102 and/or the transactional DDL module 106 provides a user interface for presenting the results of the rollback operations described above. For example, the contents of log files providing detailed information of the rollback of changes to the relational database 104 may be provided. Other types of user interfaces presenting other types of information might also be provided. From operation 510, the routine 500 proceeds to operation 512, where it ends.

Figure 6:
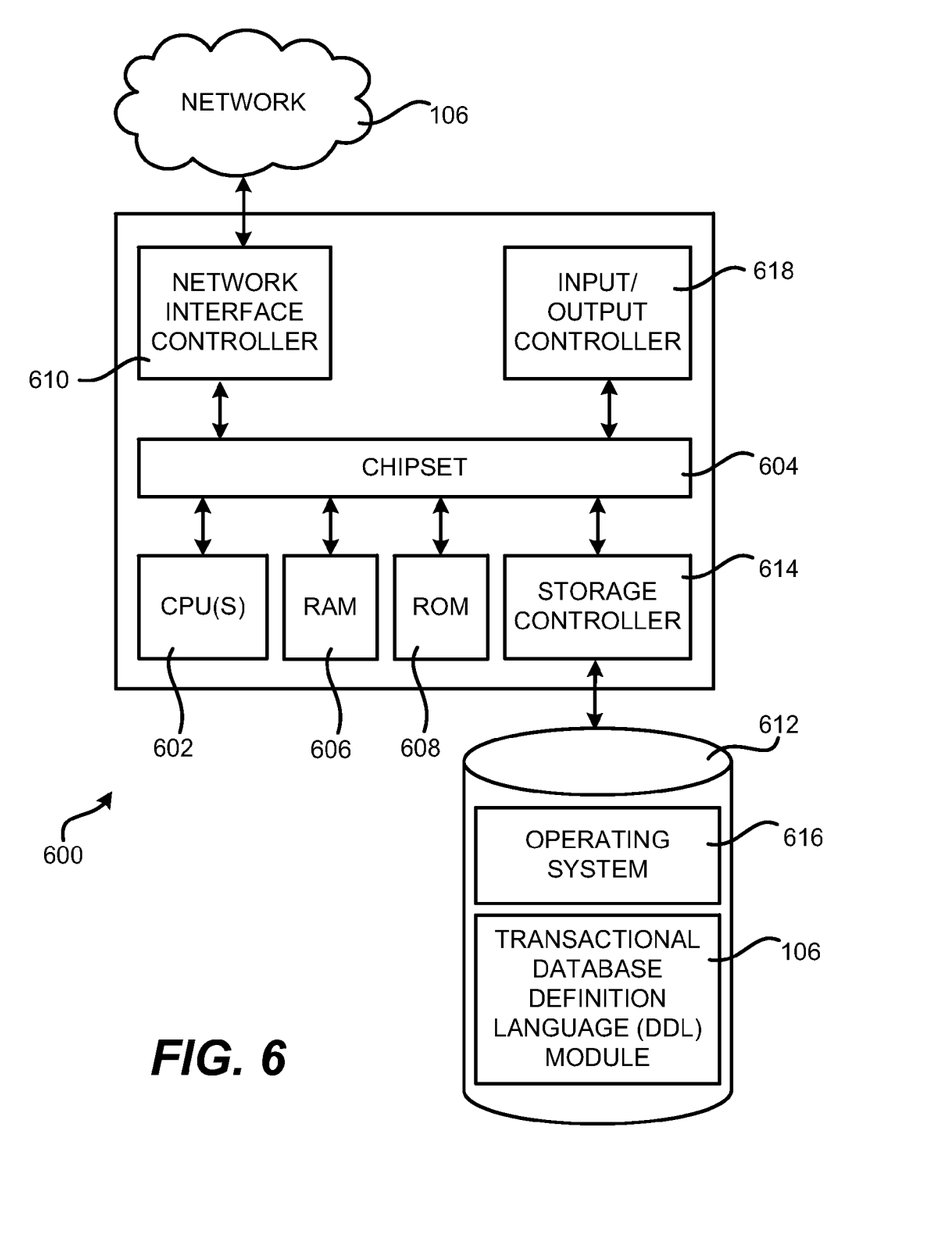
FIG. 6 is a computer architecture diagram showing one illustrative computer hardware architecture for use in computing devices configured to implement the concepts and technologies disclosed herein in one embodiment.

FIG. 6 shows an example computer architecture for a computer 600 capable of executing the software components described herein for transactional control of RDBMS DDL operations in the manner presented above. The computer architecture 600 shown in FIG. 6 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the RDBMS 102, the RDBMS client device 110, or other computing platform.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 602 operate in conjunction with a chipset 604. The CPUs 602 are standard programmable processors that perform arithmetic and logical operations necessary for the operation of the computer 600.

The CPUs 602 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 604 provides an interface between the CPUs 602 and the remainder of the components and devices on the baseboard. The chipset 604 may provide an interface to a random access memory ("RAM") 606, used as the main memory in the computer 600. The chipset 604 may further provide an interface to a computer-readable storage medium such as a read-only memory ("ROM") 608 or non-volatile RAM ("NVRAM") for storing basic routines that that help to startup the computer 600 and to transfer information between the various components and devices. The ROM 608 or NVRAM may also store other software components necessary for the operation of the computer 600 in accordance with the embodiments described herein.

According to various embodiments, the computer 600 may operate in a networked environment using logical connections to remote computing devices and computer systems through a network, such as a local-area network ("LAN"), a wide-area network ("WAN"), the Internet, or any other networking topology known in the art that connects the computer 600 to remote computers. The chipset 604 includes functionality for providing network connectivity through a network interface controller ("NIC") 610, such as a gigabit Ethernet adapter.

For example, the NIC 610 may be capable of connecting the computer 600 to other computing devices, such as client RDBMS device 110, a data storage system, and the like, over the network 112 described above in regard to FIG. 1. It should be appreciated that multiple NICs 610 may be present in the computer 600, connecting the computer to other types of networks and remote computer systems.

The computer 600 may be connected to a mass storage device 612 that provides non-volatile storage for the computer. The mass storage device 612 may store system programs, application programs, other program modules, and data, which have been described in greater detail herein. The mass storage device 612 may be connected to the computer 600 through a storage controller 614 connected to the chipset 604. The mass storage device 612 may consist of one or more physical storage units. The storage controller 614 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 600 may store data on the mass storage device 612 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 612 is characterized as primary or secondary storage, or the like.

For example, the computer 600 may store information to the mass storage device 612 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the physical storage units.

In addition to the mass storage device 612 described above, the computer 600 might have access to other computer-readable media to store and retrieve information, such as program modules, data structures, or other data. It should be appreciated by those skilled in the art that computer-readable media can be any available media that may be accessed by the computer 600, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 612 may store an operating system 616 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX, SOLARIS, or MAC OSX operating systems. It should be appreciated that other operating systems may also be utilized. The mass storage device 612 may store other system or application programs and data utilized by the computer 600. For instance, when utilized to implement the RDBMS client device 110, the mass storage device may store the RDBMS client application 114. When utilized to implement the RDBMS 102, the mass storage device may store the transactional DDL module 106 and other modules.

In one embodiment, the mass storage device 612 or other computer-readable storage media are encoded with computer-executable instructions that, when loaded into the computer 600, transform the computer from a general-purpose computing system into a special-purpose computer capable of implementing the embodiments described herein. These computer-executable instructions transform the computer 600 by specifying how the CPUs 602 transition between states, as described above. According to one embodiment, the computer 600 has access to computer-readable storage media storing computer-executable instructions that, when executed by the computer, perform the various routines and operations described herein.

The computer 600 may also include an input/output controller 618 for receiving and processing input from a number of input devices, such as a keyboard, a mouse, a touchpad, a touch screen, an electronic stylus, or other type of input device. Similarly, the input/output controller 618 may provide output to a display device, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for transactional control of RDBMS DDL operations items have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for reversing changes to a structure of a relational database, the computer-implemented method comprising executing instructions in a computer system to perform the operations of:
   receiving data defining a database definition language (DDL) transaction comprising DDL operations for modifying a structure of the relational database;
   storing data that includes instructions for the DDL operations for use in reversing changes made to the structure of the relational database by the DDL operations and data that describes a state of the relational database prior to the performance of the DDL operations;
   performing the DDL operations to modify the structure of the relational database;
   determining that the performance of any of the DDL operations has failed; and
   in response to determining that the performance of any of the DDL operations has failed, utilizing the stored data to reverse the changes made to the structure of the relational database by the DDL operations.

2. The computer-implemented method of claim 1, wherein utilizing the stored data to reverse the changes comprises performing a sequential set of DDL operations.

3. The computer-implemented method of claim 1, wherein the stored data comprises a checkpoint that is stored following a successful execution of one or more of the DDL operations.

4. The computer-implemented method of claim 3, wherein the stored data further comprises data describing a state of the relational database following the performance of one or more of the DDL operations.

5. A non-transitory computer-readable storage medium having computer-executable instructions stored thereupon which, when executed by the computer, cause the computer to:
   store a database definition language (DDL) transaction, the DDL transaction comprising DDL operations, wherein the DDL operations include operations for modifying a structure of a relational database;
   receive a request to execute the DDL transaction;
   execute the DDL operations in the DDL transaction in response to the request;
   store data that includes instructions for the DDL operations for use in reversing changes made to the relational database by the DDL operations and describes a state of the relational database prior to the performance of the DDL operations;
   determine that the performance of one or more of the DDL operations has not completed successfully; and
   utilize the stored data to reverse changes made to the relational database by a sequential set of DDL operations in the DDL transaction in response to determining that performance of one or more of the DDL operations has not completed successfully.

6. The non-transitory computer-readable storage medium of claim 5, wherein the stored data comprises a checkpoint that is stored following a successful execution of a DDL operation.

7. The non-transitory computer-readable storage medium of claim 5, wherein the stored data further comprises data describing a state of the relational database after the performance of one or more DDL operations.

8. The non-transitory computer-readable storage medium of claim 5, further comprising providing a user interface for receiving data defining the DDL operations in the DDL transaction.

9. The non-transitory computer-readable storage medium of claim 8, wherein the user interface is further configured for editing of the data defining the DDL operations in the DDL transaction.

10. The non-transitory computer-readable storage medium of claim 9, wherein the user interface is further configured to present information regarding the performance of the DDL operations and the reversal of the changes made to the relational database by the DDL operations.

11. An apparatus for reversing changes made to a relational database by database definition language (DDL) operations, the apparatus comprising:
   at least one processor; and
   a non-transitory computer-readable storage medium having computer-executable instructions stored thereon which, when executed on the at least one processor, causes the apparatus to
   store data in association with an execution of one or more DDL operations defined by a DDL transaction, wherein the DDL operations include operations for modifying a structure of the relational database and wherein the stored data includes instructions for use in reversing changes made to the relational database by the DDL operations, data describing a state of the relational database prior to the performance of one or more of the DDL operations, and data describing a state of the relational database following the performance of one or more of the DDL operations; and
   utilize the stored data to reverse the changes made to the relational database by one or more of the DDL operations.

12. The apparatus of claim 11, wherein the data stored in association with the execution of the DDL operations comprises one or more checkpoints stored following the successful completion of one or more of the DDL operations.

13. The apparatus of claim 12, wherein the computer-readable storage medium has further computer-executable instructions stored thereon which, when executed on the at least one processor, causes the apparatus to provide a user interface for defining and editing the DDL operations in the DDL transaction.

14. The apparatus of claim 13, wherein the user interface is further configured to receive a selection of a checkpoint for use in reversing the changes made to the relational database by the one or more DDL operations in response to the execution of one or more of the DDL operations failing.

* * * * *